United States Patent
Rappel

(12) 
(10) Patent No.: US 10,823,950 B2
(45) Date of Patent: Nov. 3, 2020

(54) CAMERA SYSTEM WITH BALANCED MONOCULAR CUES FOR USE IN DIGITAL STEREO MICROSCOPES

(71) Applicant: DIGITAL SURGICALS PTE. LTD., The Hangar (SG)

(72) Inventor: James Kolenchery Rappel, Bukit Batok New Town (SG)

(73) Assignee: Digital Surigcals PTE. LTD., Singapore (SG)

( * ) Notice: Subject to any disclaimer, the term of this patent is extended or adjusted under 35 U.S.C. 154(b) by 21 days.

(21) Appl. No.: 15/401,951

(22) Filed: Jan. 9, 2017

(65) Prior Publication Data

US 2017/0199366 A1 Jul. 13, 2017

Related U.S. Application Data

(60) Provisional application No. 62/276,033, filed on Jan. 7, 2016, provisional application No. 62/276,013, filed on Jan. 7, 2016.

(51) Int. Cl.
*H04N 13/239* (2018.01)
*G02B 21/36* (2006.01)
*H04N 13/122* (2018.01)

(52) U.S. Cl.
CPC .......... *G02B 21/365* (2013.01); *H04N 13/122* (2018.05); *H04N 13/239* (2018.05)

(58) Field of Classification Search
CPC .......... G03B 11/00; G03B 7/18; G03B 17/14; G02B 5/30; G02B 27/281; G02B 21/365; H04N 5/23293; H04N 5/2254; H04N 5/23232; H04N 13/239; H04N 13/122
See application file for complete search history.

(56) References Cited

U.S. PATENT DOCUMENTS

| | | | | |
|---|---|---|---|---|
| 3,994,558 A | * | 11/1976 | Schulz | G02B 21/22 359/377 |
| 5,016,173 A | * | 5/1991 | Kenet | A61B 5/0059 382/128 |
| 5,351,152 A | * | 9/1994 | Kuo | G02B 21/0032 359/234 |
| 5,729,382 A | * | 3/1998 | Morita | G02B 21/22 359/373 |
| 5,825,915 A | * | 10/1998 | Michimoto | G06T 7/593 382/154 |

(Continued)

OTHER PUBLICATIONS

Wentink, M., et al., Quantitative evaluation of three advanced laparoscopic viewing technologies: a stereo endoscope, an image projection display, and a TFT display. Surgical Endoscopy and Other Interventional Techniques, 2002. 16(8): p. 1237-1241.*

(Continued)

*Primary Examiner* — Frank F Huang
(74) *Attorney, Agent, or Firm* — Clements Bernard Walker; Lawrence A. Baratta, Jr.

(57) ABSTRACT

A system that balances monocular image quality of images of a digital stereo microscope includes a camera subsystem comprising a right camera system and s left camera system which obtains images; and a processor subsystem which generates control commands to the camera subsystem, wherein the processor subsystem uses subjective quality stored in a personalization system for the control commands.

20 Claims, 12 Drawing Sheets

(56) References Cited

U.S. PATENT DOCUMENTS

| | | | | |
|---|---|---|---|---|
| 6,020,993 | A * | 2/2000 | Greenberg | G02B 21/361 359/363 |
| 6,099,522 | A * | 8/2000 | Knopp | B23K 26/04 606/10 |
| 6,157,733 | A | 12/2000 | Swain | |
| 6,215,898 | B1 * | 4/2001 | Woodfill | G06K 9/32 348/47 |
| 6,320,696 | B1 * | 11/2001 | Greenberg | G02B 21/22 359/363 |
| 6,344,039 | B1 * | 2/2002 | Tang | A61F 9/008 359/368 |
| 6,606,406 | B1 * | 8/2003 | Zhang | G06K 9/00201 382/154 |
| 6,763,125 | B2 * | 7/2004 | Ohta | G06K 9/00798 340/907 |
| 6,798,406 | B1 | 9/2004 | Jones et al. | |
| 6,996,341 | B2 * | 2/2006 | Hanzawa | G03B 35/10 348/79 |
| 7,046,822 | B1 * | 5/2006 | Knoeppel | B60W 30/16 382/103 |
| 7,139,424 | B2 * | 11/2006 | Sogawa | G06T 5/006 382/154 |
| 7,369,306 | B2 * | 5/2008 | Straehle | G02B 5/04 359/372 |
| 7,453,631 | B2 * | 11/2008 | Namii | A61B 90/36 359/377 |
| 7,625,088 | B2 * | 12/2009 | Fujita | G06T 7/593 351/206 |
| 7,720,277 | B2 * | 5/2010 | Hattori | G06T 7/593 382/104 |
| 7,756,357 | B2 * | 7/2010 | Yoneyama | G06K 9/00127 359/368 |
| 7,768,701 | B2 * | 8/2010 | Namii | A61B 90/36 359/377 |
| 7,784,946 | B2 * | 8/2010 | LeBlanc | A61B 3/132 351/210 |
| 7,821,705 | B2 * | 10/2010 | Hayashi | G02B 21/361 359/380 |
| 7,830,445 | B2 * | 11/2010 | Kawahara | G03B 13/36 348/345 |
| 7,897,942 | B1 * | 3/2011 | Bareket | G03F 7/70783 250/398 |
| 7,932,504 | B2 * | 4/2011 | Yamada | G01N 21/6458 250/461.2 |
| 8,199,147 | B2 * | 6/2012 | Ishiyama | H04N 5/76 345/419 |
| 8,233,031 | B2 * | 7/2012 | Saito | G01C 3/08 348/47 |
| 8,430,815 | B2 | 4/2013 | Marka et al. | |
| 8,508,646 | B2 * | 8/2013 | Katerberg | G02B 27/281 348/222.1 |
| 8,542,929 | B2 | 9/2013 | Kim et al. | |
| 9,070,306 | B2 | 6/2015 | Rappel et al. | |
| 9,330,477 | B2 | 5/2016 | Rappel | |
| 2003/0112509 | A1 * | 6/2003 | Takahashi | G02B 21/0012 359/466 |
| 2004/0070822 | A1 * | 4/2004 | Shioda | A61B 1/04 359/372 |
| 2004/0136567 | A1 * | 7/2004 | Billinghurst | G06K 9/32 382/103 |
| 2006/0004292 | A1 * | 1/2006 | Beylin | A61B 5/0071 600/476 |
| 2008/0002878 | A1 * | 1/2008 | Meiyappan | G06K 9/32 382/154 |
| 2009/0275929 | A1 * | 11/2009 | Zickler | A61B 3/113 606/5 |
| 2010/0141802 | A1 * | 6/2010 | Knight | H04N 5/23212 348/240.3 |
| 2011/0080536 | A1 * | 4/2011 | Nakamura | G02B 7/001 349/15 |
| 2011/0157350 | A1 * | 6/2011 | Yamamoto | G02B 21/14 348/79 |

OTHER PUBLICATIONS

Rappel, PhD thesis, Digital Stereo Microscope With Hand-Eye Collocation for Surgery, 2013.*

(Rappel et al. Software Defined Surgical Stereo Microscope, International Conference on Software Intelligence Technologies and Applications & International Conference on Frontiers of Internet of Things 2014.*

* cited by examiner

US 10,823,950 B2

CAMERA SYSTEM WITH BALANCED MONOCULAR CUES FOR USE IN DIGITAL STEREO MICROSCOPES

CROSS-REFERENCE TO RELATED APPLICATION(S)

The present patent/application claims priority to U.S. Provisional Patent Application No. 62/276,033, filed on Jan. 7, 2016, and entitled "CAMERA SYSTEM WITH BALANCED MONOCULAR CUES FOR USE IN DIGITAL STEREO MICROSCOPES," and to U.S. Provisional Patent Application No. 62/276,013, filed on Jan. 7, 2016, and entitled "FRAME SYNCHRONIZATION FOR STEREO IMAGE CAPTURES IN DIGITAL SURGICAL MICROSCOPE," the contents of both are incorporated by reference.

FIELD OF THE DISCLOSURE

The present disclosure generally relates to digital microscope systems and methods. More particularly, the present disclosure relates to a camera system with balanced monocular cues for use in digital stereo microscopes.

BACKGROUND OF THE DISCLOSURE

Stereo microscopes provide depth perception to the human observer through stereo views of the scene under the microscope. It is well known that there are many binocular cues and monocular cues that affects the human binocular vision while observing the tissues through the microscopes. Binocular cues include retinal disparity and kinesthetic sensing of the eye vergence. Monocular cues include relative size: distant objects subtend smaller visual angles than near objects, grain, shadow, color, lighting, blurriness and motion parallax. These monocular cues may be lost or distorted while it is being processed by an image acquisition and processing systems of digital stereo microscopes. Furthermore, the left and right view of the same field of view may have differing monocular cues. When monocular cues are incorrectly presented to the human observer, there are multiple problems in perceiving depth information to perform surgical manipulations.

The human visual system being adaptive will try to adjust the various eye muscles to seek clarity of the presented images as if they are from the real scene. In a real scene, adjustments to the optical characteristics of the human visual system may improve quality. However, when observing captured images, any tuning of the human visual system will not improve its quality since it is presented on a medium with fixed pixel density, color gamut, and contrast. Still, the human visual system will take hints of blur and brightness level as visual cues to adjust the muscle tensions, will try to adjust them to improve clarity. As a consequence, unless the monocular depth cues enhance the stereoscopic depth cues (Binocular cues), the observer will experience confusion, lack of visual clarity and fatigue.

The human visual system also exhibits binocular interaction. For example, light falling on one eye affects not only the dilation of the pupil of that eye but also of the other eye. Similarly, accommodation and vergence of one eye are affected by the accommodation and vergence of the other eye. However, in camera based machine vision systems employing stereopsis, there is no interaction between the independent cameras about the brightness level, focus, and specularity, and the images seen by them are not compensated through the binocular interaction seen in human visual systems.

Yet another characteristic of the human visual system is that the light entering the eye through the pupil is focused on the retina which includes approximately six million cones located mostly at the center of the retina, surrounded by some 120 million rods. The cones, which are responsible for our color vision, function best in bright light (photopic vision), while the color-blind rods are responsible for our night vision (scotopic vision). For scenes with an average luminance above a certain Lux, photopic vision dominates and below that scotopic vision dominates. When a pair of images is presented, their scotopic to photopic vision ratio must be adjusted to be equal.

The human visual system has developed by visualizing objects in the natural sunlight and the perception of colors are developed under the color temperature of the natural light. When synthetic lights such as Light Emitting Diode (LED) lights, which emits light of a restricted smaller spectrum, is used to illuminate the scene, color temperature adjustments must be made to the camera sensor so that it appears natural to the human observer. It is especially necessary to render RED color correctly, and this ability of light is indicated by the R9 value. Moreover, since the reflective characteristics of the scene changes during a surgical procedure, it is necessary to adjust the settings of the light polarizer to have correct color saturation. In a multi-camera configuration, polarizers of each camera must be adjusted to suit the tissue and light incidence.

Reflection of a randomly polarized light, such as the microscope light fixture, from a partially reflecting surface, such as the air-surgical tissue interface, results in linear polarization of the light at an angle called Brewster's angle. Polarizer filters such as a linear polarizer filter can be oriented to produce opacity to the light entering at Brewster's angle to the camera. Alternatively, the incident light on tissue may be polarized and filtered such that it is not at Brewster's angle for the surface to reflect completely. In both cases, the specularity of the right and left view images must be made similar to improve visual clarity.

There are no existing solutions that enhance the binocular stereo vision through matched monocular cues in the left and right eye views suitable for digital stereo microscopy. In summary, it is required that the digital stereo microscope system must calibrate its monocular cues such as focus blur, contrast, specular intensity, intensity level, zoom level, color temperature and R9 value in the Color Rendering Index (CRI) of the lighting, suitable for digital stereo microscopy. In addition, it should make the right and left eye view images similar in these parameters so that the stereopsis produced depth perception is enhanced.

U.S. Pat. No. 8,508,646 describes a system that rotates a polarizer so that the specular reflection is minimal. Specular reflection is identified by using the Saturation and Intensity. It is well known that specular reflection reduces the saturation of the color and increases the brightness of the image. The disclosed system computes these measures for every position of the polarizer and detects the position of minimum glare. However, such an approach is laborious to be applied in a surgical camera.

U.S. Pat. No. 8,430,815 discloses a surgical lighting system that transmits the color temperature to an imaging system so that the imaging system can adjust its white balance. However, such systems are unsuitable for the surgical microscope imaging system which uses a lighting system to correct the variations in the color temperature while placed in a room with ambient lighting such as the ceiling lights of the operating room. For digital stereo microscopes, no adjustments to the white balance are necessary since the white balance is adjusted for a previously known color temperature suiting the eye of the surgeon. It is only necessary to adjust the color temperature and color index to a previously known value to improve the natural vision, which is not disclosed.

U.S. Pat. No. 6,798,406 discloses the generation of comfortable stereo by changing the parallax between the left and right eye view. It describes a method of determining the cropping of the images without causing strain to the eyes. But it does not suggest enhancing the monocular cues of the images itself.

U.S. Pat. No. 8,542,929 discloses a method and system for improving image quality and enhancing depth sensation by generating depth cue indices of regions of the images and accordingly adjusting the image. It uses a method of estimating the depth sensation index of an image.

U.S. Pat. No. 6,157,733 discloses methods of incorporating monocular cues to enhance the depth sensation. It may use shading, brightness, blur and occlusion after identifying the foreground, background and the object of interest.

BRIEF SUMMARY OF THE DISCLOSURE

In an exemplary embodiment, a system that balances monocular image quality of images of a digital stereo microscope includes a camera subsystem comprising a right camera system and a left camera system which obtains images; and a processor subsystem which generates control commands to the camera subsystem, wherein the processor subsystem uses subjective quality stored in a personalization system for the control commands. The processor subsystem evaluates the monocular image quality through monocular cues which are personalized for a specific user utilizing the subjective monocular cue based index. The control commands comprise adjusting any of focus, camera contrast function, zoom, glare levels, start of image capture, lighting levels and light quality for the right camera system and/or the left camera. The monocular cues comprise a plurality of focus blur, contrast, specular intensity, time of image capture, light intensity level, zoom level, color temperature and R9 value in the Color Rendering Index (CRI) of the lighting. The monocular cues are evaluated using blur as a quality metric estimated from the images and classified based on a plurality of structures in the image for adjusting focus as the monocular cues. The monocular cues are evaluated using intensity levels and color saturation directly assessed from the images and using histogram comparisons between the images from the right camera system and the left camera system. The system further includes a sensor subsystem is configured to measure light, and to measure orientation and position of the right camera system and the left camera system. The time of capture is extracted by processing the captured image.

In another exemplary embodiment, a method in a digital stereo microscope includes balancing image quality of an image by determining a subjective monocular image quality index for a surgeon; determining parameter values that produced the subjective monocular image quality index; evaluating quality of the image in a new environment; comparing the quality with the subjective monocular image quality index; measuring current imaging parameters; and adjusting the imaging parameters to reduce a difference between the imaging parameters of the subjective monocular image quality index and the measured parameters. The evaluating further comprises: balancing differences between a right camera system and a left camera system in terms of monocular cues. The evaluating further comprises: personalizing monocular cues for a specific user utilizing the subjective monocular cue based index. The adjusting comprises adjusting any of focus, camera contrast function, zoom, glare levels, start of image capture, lighting levels and light quality for the right camera system and/or the left camera. The monocular cues comprise a plurality of focus blur, contrast, specular intensity, time of image capture, light intensity level, zoom level, color temperature and R9 value in the Color Rendering Index (CRI) of the lighting. The evaluating comprises using blur as a quality metric estimated from the images and classified based on a plurality of structures in the image for adjusting focus as the monocular cues. The evaluating comprises using intensity levels and color saturation directly assessed from the images and using histogram comparisons between the images from the right camera system and the left camera system. A sensor subsystem is configured to measure light, and to measure orientation and position of the right camera system and the left camera system.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
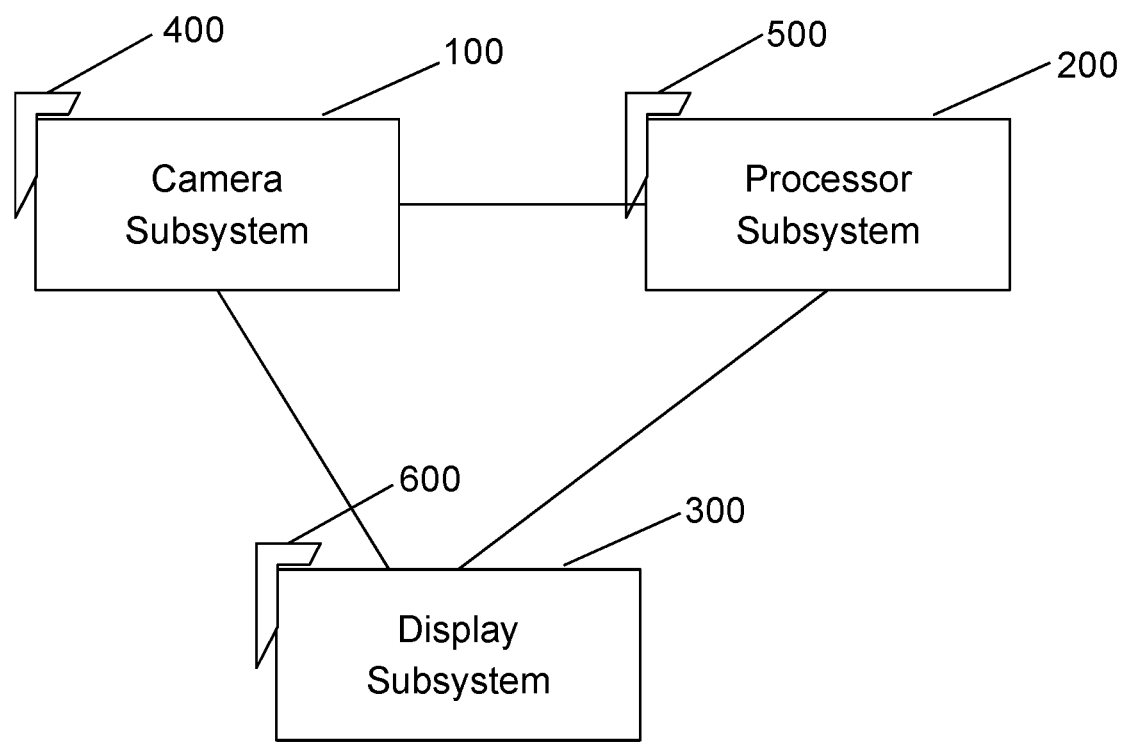
FIG. 1 is a monocular cue balanced camera system.

In various exemplary embodiments, a digital stereo microscope system calibrates the monocular cues from the captured image and from property sensors such as the light meters. The system uses the measured monocular cues and adjusts the focus, camera contrast function, lighting levels and light quality so that both the left and right eye pairs of images improve the human visual perception of depth. The system includes a camera subsystem 100 in data communication with a processing system 200 which performs the measurement and evaluation of the monocular cues. The monocular cues are evaluated in real-time in a continuous manner, and the cues are communicated to the processing system controller 250 so that both the right and left camera systems can produce balanced images using the commands received through the frame processor 270. Frame processor 270 receives video streams from the camera subsystem 100 and sends commands to the camera subsystem 100 from the processing system controller 250. The processing system control 250 further includes balancing error computation component which computes the difference between the left and right eye images of a stereo pair of images in terms of the monocular cues.

The processing system 200 also has a personalization component 240 by which the monocular values that are evaluated to be suitable for the eyes of a given surgeon user at a previously determined set of conditions of lighting and camera parameters is brought to a new set of camera parameters and lighting conditions. To achieve the personalization of the monocular cues, a subjective monocular cue based index is derived and used.

There are several advantages of using the present system in a digital surgical microscope. The subjective monocular cue preferences for a given surgeon's eyes and a given display device can be expressed in standardized stereo image pairs. The system provides a standardized set of image pairs which are augmented in monocular quality to suit the display device and the surgeon's eyes. When a new sequence of stereo images are obtained from the real scene with different lighting conditions, the monocular cues are evaluated and the camera system's parameters such as lighting, focus, zoom, glare level are adjusted so that the monocular cues are similar to the personalized samples and the pairwise match between the left and right images are same. Since the system can match the monocular cues, it is easy to bring the system to new lighting conditions such as ambulatory settings, operating room settings, and surgical training lab settings easily. Another advantage is that the system is able to accept measurements from external measuring systems such as a light meter, it is easy to add new measuring sensors when they become available. The measurements can then be used as a subjective visual cue index. Yet another advantage is that instead of adjusting various controls such as the light, focus, zoom, glare, disparity, the user can adjust the image quality to be near to the quality of the reference stereo pairs. This reduces the number of independent controls needed and also makes the operation simpler.

An exemplary embodiment of the present system is shown in FIG. 1 which includes a camera subsystem 100, in data communication with a processor subsystem 200 which is coupled to a display subsystem 300. In some implementations, the camera subsystem 100 is in data communication with the display subsystem 300. The camera subsystem 100, processor subsystem 200 and the display subsystem 300 have respective mountings namely a camera mounting 400, a processor mounting 500 and a display mounting 600. The mountings 400, 500, 600 are constructed to suit the operational requirement of a particular application. For example, the requirement of the mounting of a digital stereo microscope used in ambulatory settings is different from the one used in the operating room and is different from the one used in a surgery training lab. The mountings 400, 500, 600 are selected to provide a convenient view to the surgeon and provide portability suiting the application.

Figure 2:
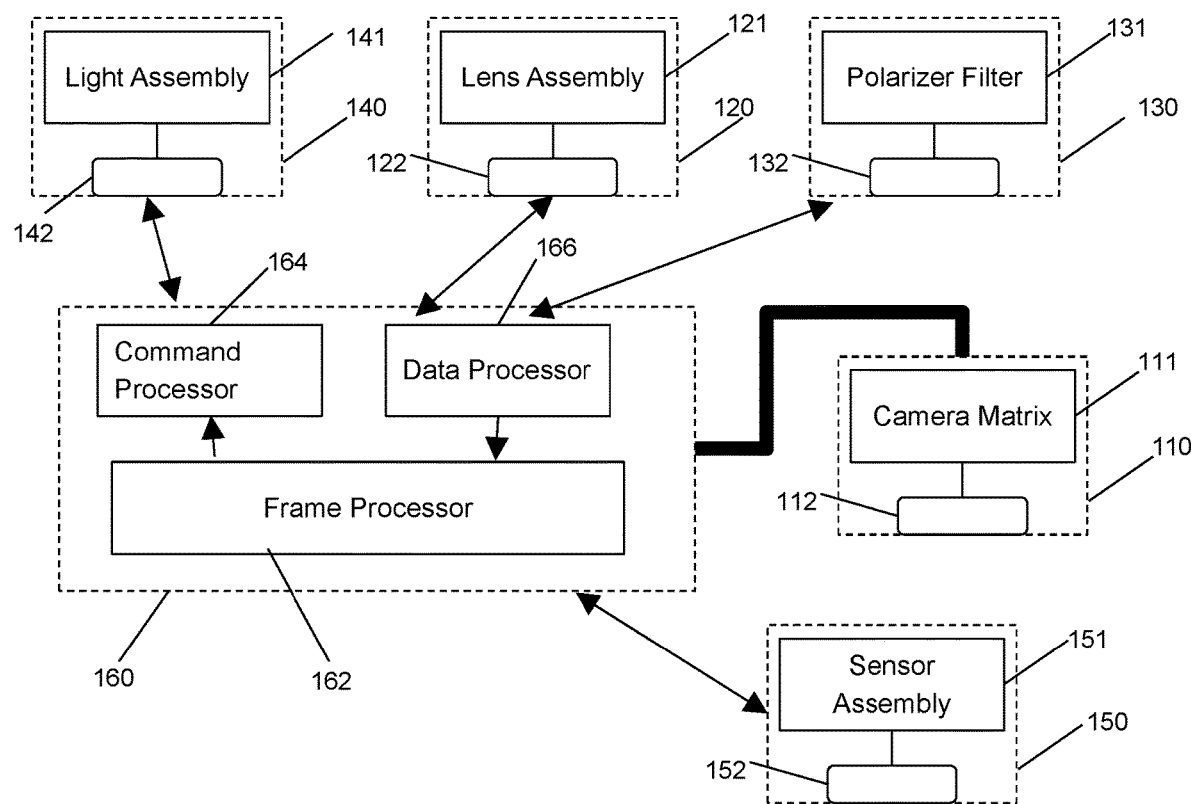
FIG. 2 is a camera subsystem which controls independent monocular cue elements based on the control commands from the processing subsystem.

In an exemplary embodiment, the camera subsystem 100 of FIG. 2, has two or more cameras 110, two of which are paired for a given instance to be the stereo pairs. Each of the cameras 110 has a camera matrix assembly 111 which generates the electrical output of the scene using a Complementary metal-oxide-semiconductor (CMOS) or charge-coupled device (CCD) matrix of sensors. The light falling on the sensors is converted into electrical signals which are read and encoded by the camera matrix control 112. Each camera 110 has a focus and zoom subsystem 120 having a lens assembly 121 and a corresponding lens control 122. The lens control 122 is used to change the zoom and focus of the camera 110. Each camera 110 of the camera subsystem 100 has a glare elimination subsystem 130 having a polarizer filter 131 and a corresponding polarizer control 132. In some implementations, instead of having independent glare elimination subsystem 130 for the cameras 110, a single glare elimination subsystem may be used in coupling with the light subsystem 140. Irrespective of the specific implementation, the polarizer control 132 can be used to control the specular reflections from the scene viewed by the cameras 110 by providing opacity to a specific angle of light entry or specific phase of the light wave. The polarizer 131 could be either circular or linear.

The camera subsystem has a lighting subsystem 140 including luminaries 141, light control 142. The luminaries 141 are controlled by the light control 142 to emit light of a defined color temperature and R9 value. The controller 142 is capable of controlling the intensity of each of the luminaries 141. It may be using the intensity by regulating the voltage or current or uses pulse width modulation to control the duration of the on and off times of the luminaries. Multiple luminaires may be combined and operated as a single luminary so that it is on or off at the same time and have the same voltage and current applied.

The camera subsystem 100 has a sensor subsystem 150 which has a matrix of sensors 151 such as sensors for measuring the orientation of the camera 110, its position, or the amount of light. The light sensor measures the light intensity of the field of view of the camera system. It can be operated independently of the luminaries so that the ambient light intensity can be measured. Other property sensors may be integrated into the matrix of the sensors 151.

The camera system controller 160 communicates with a processor system controller 250. The controllers 160, 250 exchange frames of data and control to effect communication between the processor and the camera subsystems 100, 200. The camera system controller 160 has a frame processor 162 to perform framing and deframing operations to suit the underlying communication protocol. Examples of communication protocols include USB 3.0 protocol, Gigabit Ethernet protocol, 10G Ethernet protocol, Firewire, etc. The frame processor 162 creates suitable data control frames which include acknowledging the data or command received, frame control mechanisms for error recovery. It also decapsulates the data and commands received in the frame and forward it to respective processors, viz., data to the camera data processor 166 and camera command processor 164. Most of the cases, the data is received from the camera system controller 160 and other peripheral components.

The camera system controller 160 generates control commands to the glare elimination subsystem 130 zooming, the focusing subsystem 120, and the lighting subsystem 140 so that the produced image is of similar monocular quality. It also issues commands to read the sensed values from the sensor subsystem 150.

A typical camera configuration is shown in FIG. 2. The frames of data and commands are processed by the frame processor 162. Incoming frames are de-framed to extract the command and associated data. The incoming data is time stamped and framed to be sent to receiving processor subsystem 200 which processes the image data and sends back control commands. The commands may be addressed to the camera matrix control 112, lens control 122, lighting control 142 or other controls such as polarizer control 132 or sensor control 152. The data generated by the camera is framed and send to the processor subsystem 200.

Figure 3:
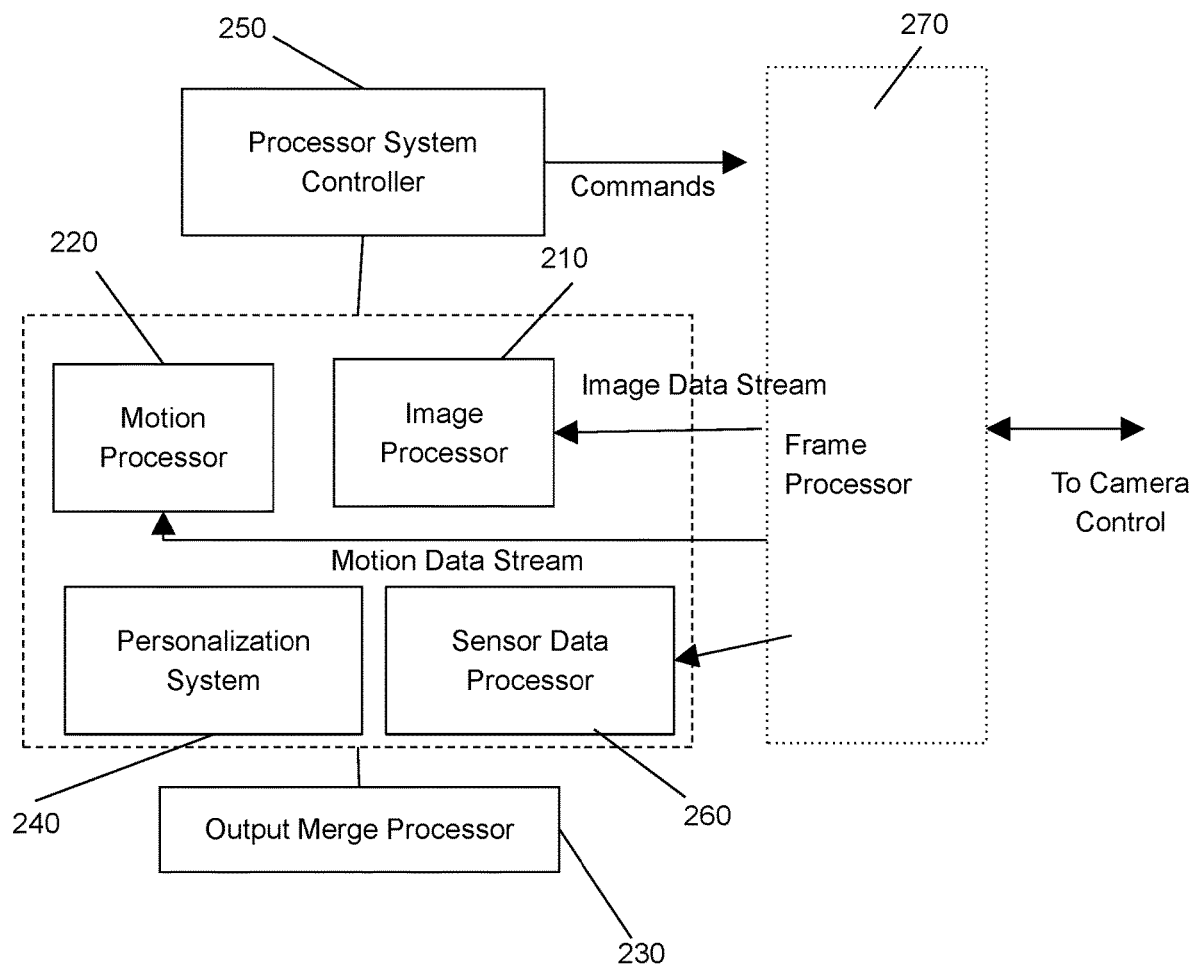
FIG. 3 is a processing subsystem which evaluates the monocular cues, determines the type of control and issues control commands to the camera control.

As shown in FIG. 3, the processing of the data may be done by the image processor 210, or the motion data processor 220, a personalization system 240, or the sensor data processor 260. Some operations on the data are done in the camera data processor 166. The camera data processor 166 may do such operations such as encoding the data according to a color model. The processors of the processing system 200 may perform more complex operations such as filtering reflections from an image, adjusting disparity between two images, computing the monocular quality of the image. The camera command processor 164 may transmit and receive configuration related data as a part of command processing. It can use several internal protocols such the Inter-Integrated Circuit (I2C) protocol which allows several devices to be listening to a protocol bus line for the address being transmitted. If the address matches the address of the device, it may receive and act on the command word then transmitted. The devices may send data through the same mechanism as the command word transmission. Other protocols may also be used.

In the processor subsystem 200, the image data processor 210, the sensor data processor 260 and the graphics data processor 220, and personalization system 240 may send quality vectors to the camera system controller 160. It may use either the processor system controller 250 or use the frame processor 270 directly to send commands to the camera system controller 160. A preferred implementation uses the processor system controller 250 to communicate control information to the camera controller.

In some cases, any amount of adjustments to the lens, lighting, or polarizer will not yield an image enhancing effect because of a wrong orientation or position of the system. Hence a monocular quality metric is displayed which changes the orientation and position of the camera system. The system displayed a change in the quality metric may guide manual correction when automatic corrections are difficult and tedious.

Figure 4:
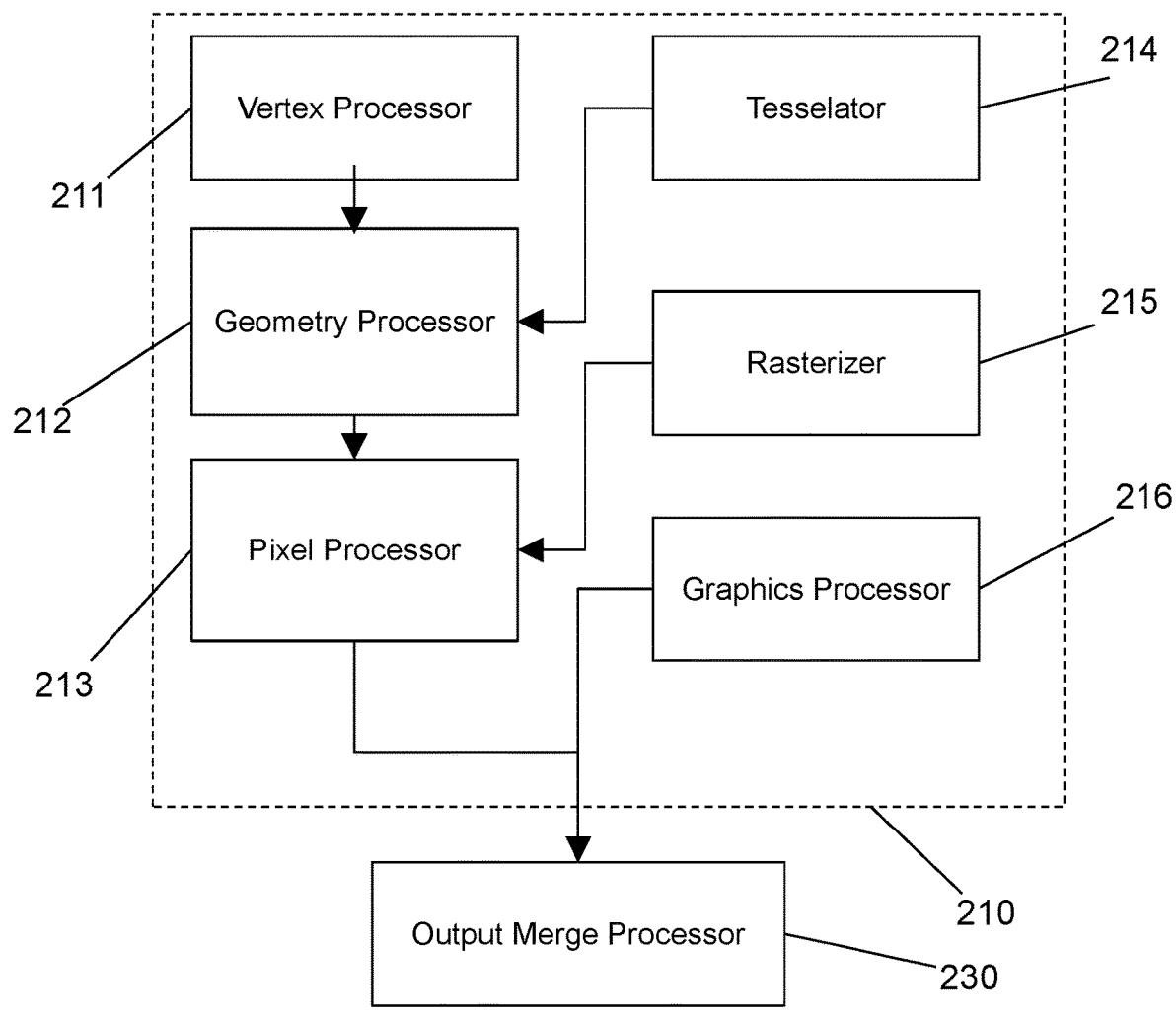
FIG. 4 is an image data processing system which helps to derive image based monocular cues.

At the processor subsystem 200, similar to the camera subsystem 100, there are two processing engines. The image processor 210 which process the image and graphics to create a rendering for the left and right eye views for the observer using the microscope. The image processor 210 uses a number of stages of operations as shown in FIG. 4, through available processing units in hardware components such as graphics accelerator, or graphics processing units (GPU). There are vertex 211, geometry 212, pixel 213, and graphics 216 processors that can augment the images generated by the cameras. The configuration of the cameras is represented by transformation matrices used in the vertex processor 211. The geometry processor 212 operates on primitive shapes such as triangle and line and determine whether a primitive is part of the view. They are useful when three-dimensional (3D) information is captured with depth information and segmented into primitives. Segmenting the 3D information into primitives is done by a tessellator 214. The primitives may be rasterized into pixels by a rasterizer 215. If the data is two-dimensional (2D) data and the 3D information is obtained from stereopsis, then all stages of the processing pipeline are not necessary, thereby reducing the processing overhead and delay. An output merger processor 230 combines the output from various rendering pipelines. Since the processors scan through the whole data, quality assessment functions are easy to be implemented in the processors. However, the processed quality metric must be given to the processor system controller 250 as shown in FIG. 3 to generate control commands.

In addition to the data processing, the processor subsystem also performs control processing based on the evaluated quality of the images. If the images exhibit differences in the quality of the images, then commands to control the lens assembly, lighting, polarizer and camera parameters are generated and sent to the camera controller.

Instead of processing the image quality in the image processor 210 and sending the quality metrics to the processor system control, a copy of the image stream may be sent to the processor control system 250 which will derive the quality metrics and generate the control commands to be framed and send to the camera control. There can be multiple computing processors used by the graphics processors, image processors and processor system control. The best mode implementation uses GPU for the graphics and image processing and CPU for control processing. There can be multiple CPUs in the system.

The motion data processor 220 analyzes the motion data and can be used for annotation, giving gesture-based commands and for simply tracking tool motion. In some configurations, a camera other than the imaging cameras is used to generate the tool motion data.

Figure 5:
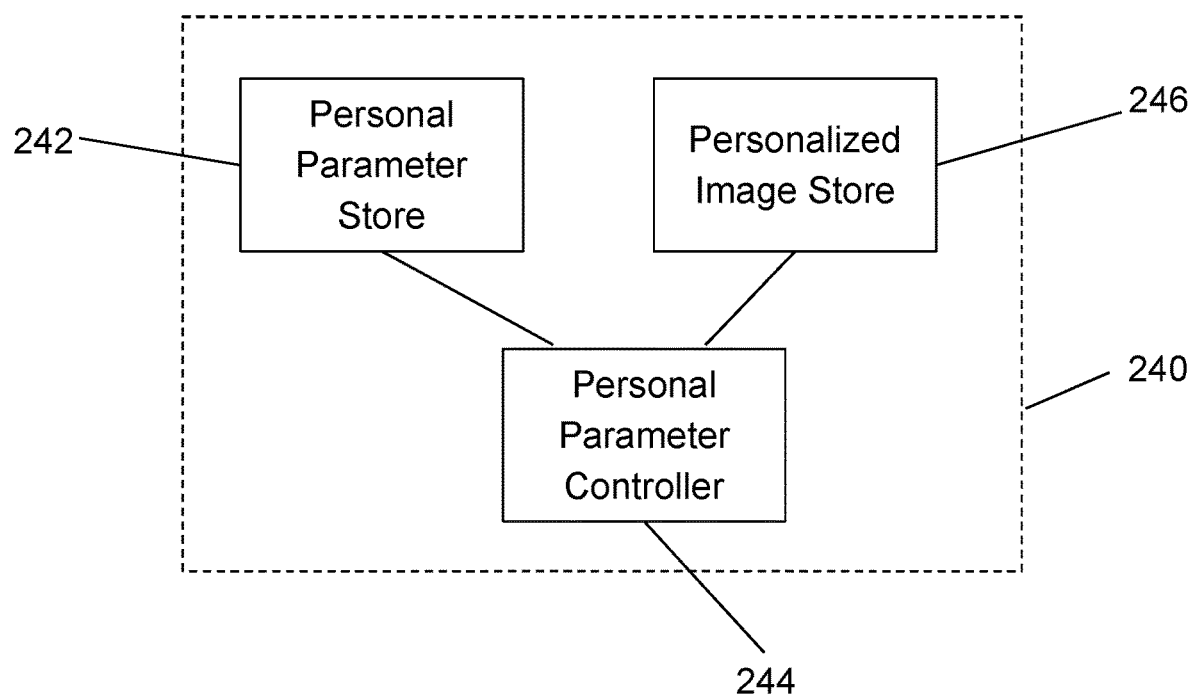
FIG. 5 is a personalization subsystem which generates parameters suiting the eye of a specific surgeon.
Figure 6:
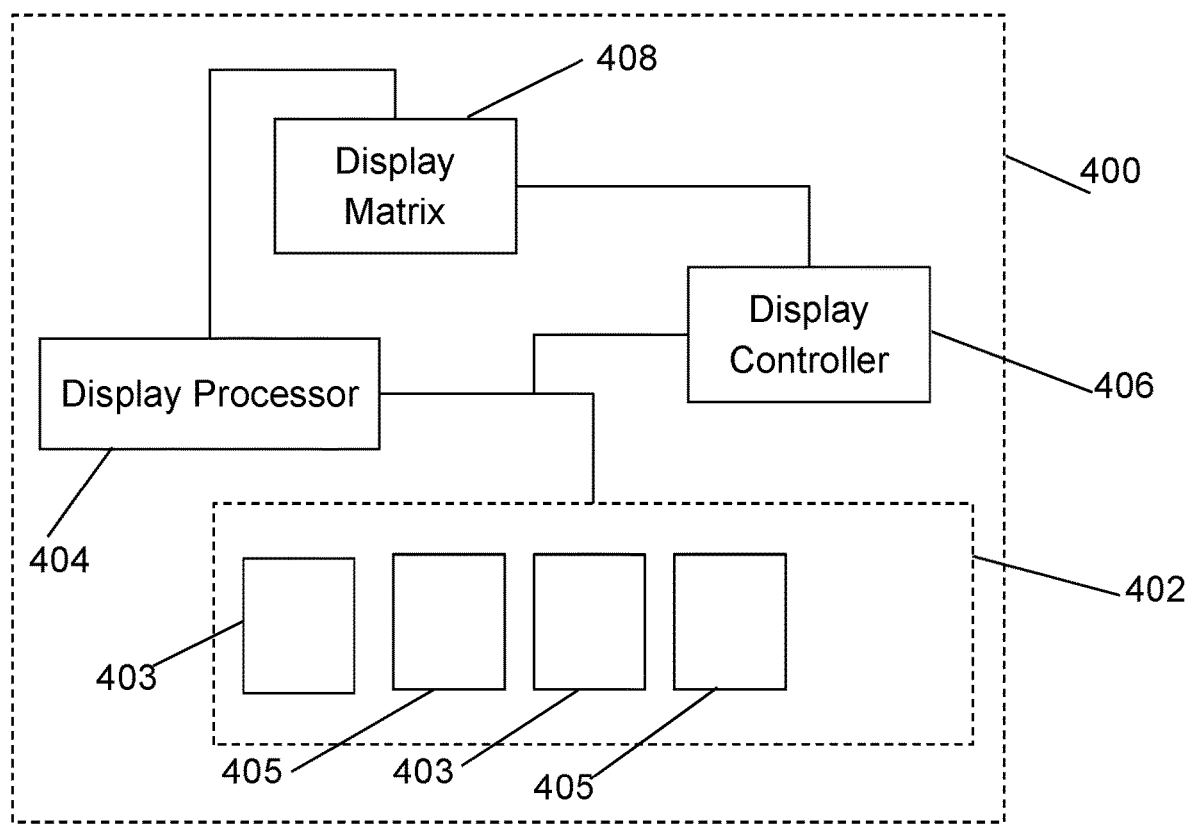
FIG. 6 is a display subsystem which generates a display using the personalized and balanced display parameters.

The personalization system 240 has two functions. It creates custom personalized image stereo pairs for specific users. As shown in FIG. 5, a personal parameter store 242 collects the parameters such as the height of the microscope, its inclination, the zoom level, the lighting level, the disparity that is convenient to a specific surgeon user. The image pairs from the personal image store 246 are augmented to generate fitting stereo pairs. Personal parameters are stored, retrieved and communicated to other system components by the personal parameter controller 244. The personalization system may use data processed by the sensor data processor to derive parameters such as inclination, lighting level. The personalized image store 246 provides the templates for the images to be produced by the system both in terms of monocular cues and in terms of match of monocular cues between the left and right images. The comparison of the real stereo pairs with the template images cannot be done directly. Instead, various quality metrics are derived and are compared.

Various quality metrics can be assessed using existing well-known algorithms. For example, blur, one of the quality metrics can be identified and estimated by detecting the edges and its sharpness. Based on the sharpness, edges may be classified as Dirac, Step, and Roof structures. Under blurring, edges lose its sharpness. The number of Dirac, Step and Roof Structures present in the image can be used to adjust the focus control. In order to check the relative focus difference between the left and right eye view images, the count of their Dirac, Step and Roof edges may be compared.

Another related method is to classify every pixel as one of a Dirac, Step or Roof edge structure or of a non-edge. The histogram contains pixel counts of Dirac, Step, Roof or non-edge structures. The histogram thus computed for the right and left eye views may be compared for their difference in the quality and be used as a measure.

Similarly, the intensity levels and color saturation can be directly assessed by mapping the image to color spaces such as hue, saturation, and intensity (HSI). After mapping to a color space such as HSI, the histogram of the saturation and intensity levels may be compared to the left and right eye view images.

When specular reflection distorts the image, the intensity will be increased, and the color saturation is decreased. The effect can be seen from their Saturation and Intensity histograms for the same level of the hue. Specular reflections are a cause of confusion and lack of clarity in 3D images that are stereoscopically composed. Hence removing specular reflections is very much desired. In one implementation, polarizer filters are used to remove the specular reflections since specular reflections of non-polarized light come at a specific angle based on the surfaces, for example, air and tissue and is governed by Brewster's angle. In order to quantify the amount of reflection removed by the polarizer filter, a method is needed which can estimate the quality of the resulting image.

In the H-S(Hue Saturation) space, there are two properties that Pixels with the same diffuse chromaticity have the same hue value, and thus assemble to be a line segment in the H-S space. Diffuse and specular pixels with the same diffuse chromaticity locate at a different side of a line segment. Specifically, diffuse pixels have larger saturation than specular ones.

Based on this observation that diffuse pixels have better saturation than the specular ones, a heuristic estimation of specularity can be as follows.

Let H[0] . . . H[255] be the Hue histograms for hues 0 . . . 255, which is the number of pixels has the same hue value. While computing the histogram, perform an operation to estimate its saturation. For each hue value h, maintain three saturation values. Low, Mid and High denoted by H[h].Low, H[h].Mid and H[h].High.

A pixel is classified as a specular or diffuse pixel based on the saturation. In one method, if a pixel has a saturation value less than the mid saturation value of its hue bucket, then it is treated as a specular pixel. It is expressed in the following pseudo-code

```
if (p.sat < H[p.hue].mid) return true;
return false;
```

In another heuristic, in addition to the saturation level, the intensity is also checked. The median intensity of the pixel at that hue is maintained as H[p.hue].bright and is compared against the pixel's intensity.

```
if (p.sat < H[p.hue].mid) {
    if (p.bright > H[p.hue].bright ) return true;
}
return false;
```

The rendered image is displayed by the display system 400 which has independent control of its intensity, color saturation and refresh rate which can be controlled. The personalization system 240 will store the personal preferences of these values and is programmed through the display controller 406. The images for the left and right eye views 403 and 405 respectively may be stored in a display buffer 402 which can store multiple frames. The frames are processed by the display processor 404 to be compliant with the display parameter settings obtained from the personalization system 240.

Figure 7:
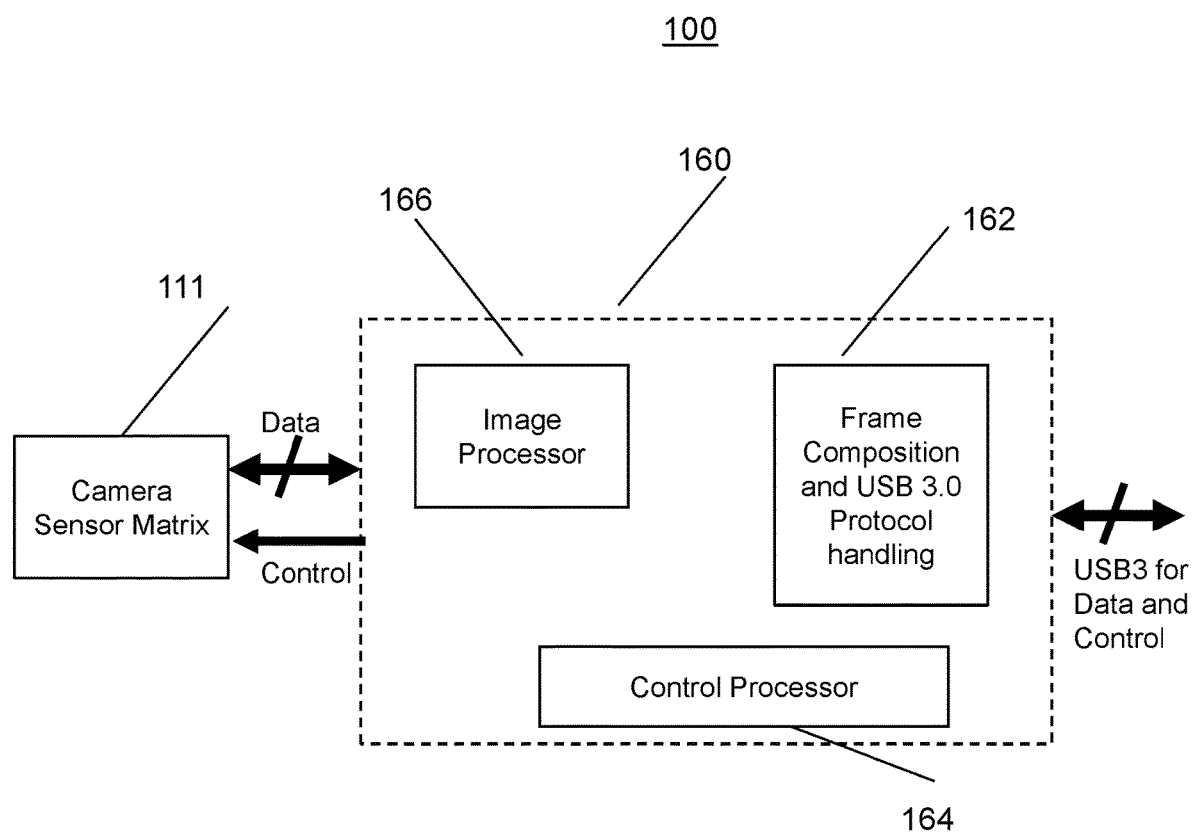
FIG. 7 is a block diagram of an exemplary implementation of a camera subsystem.

FIG. 7 is a block diagram of an exemplary implementation of a camera subsystem 100.

Figure 8:
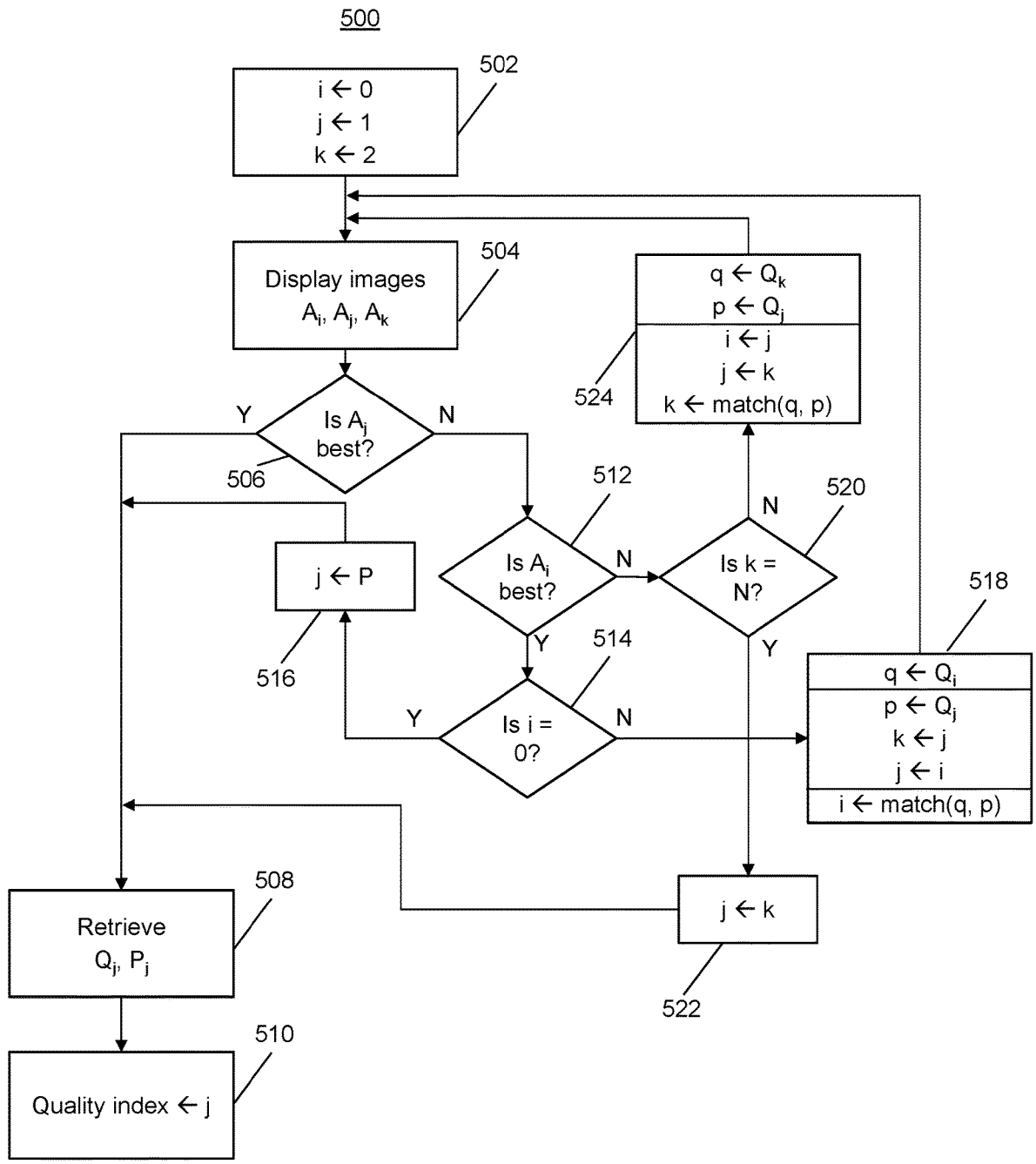
FIG. 8 is a flowchart of a process for determining a subjective quality index using the systems and methods.
Figure 9:
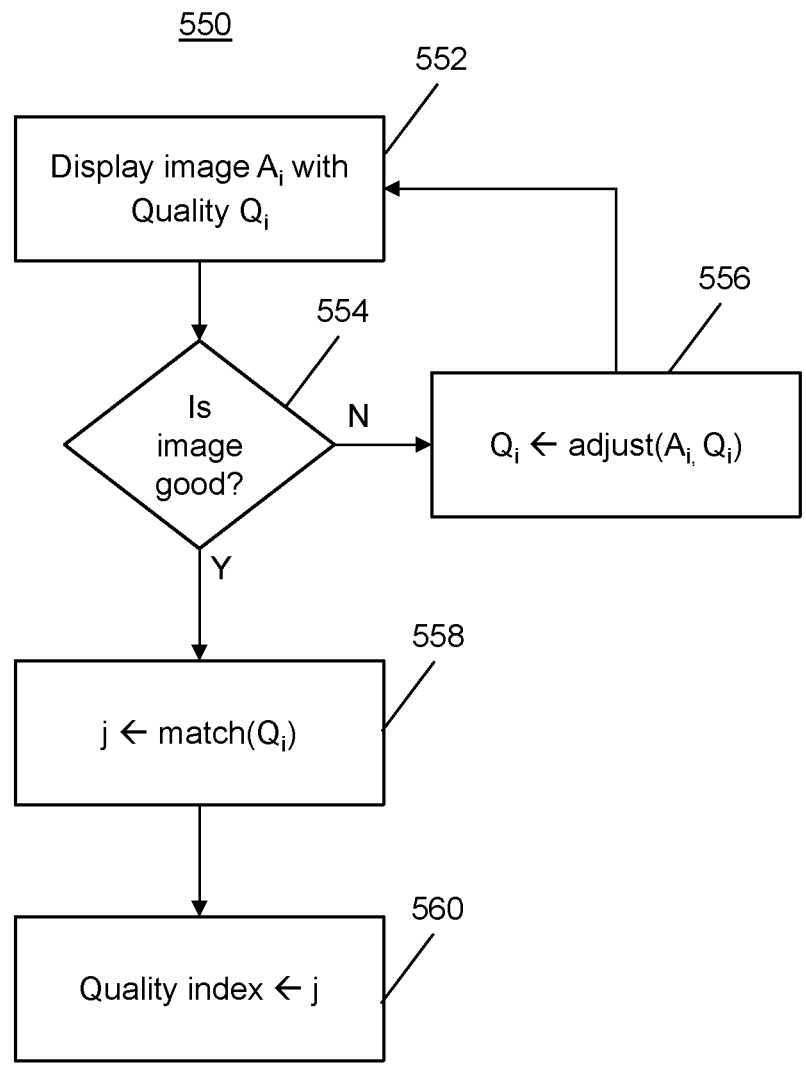
FIG. 9 is a flowchart of a process of another exemplary embodiment for determining a subjective quality index using the systems and methods.
Figure 10:
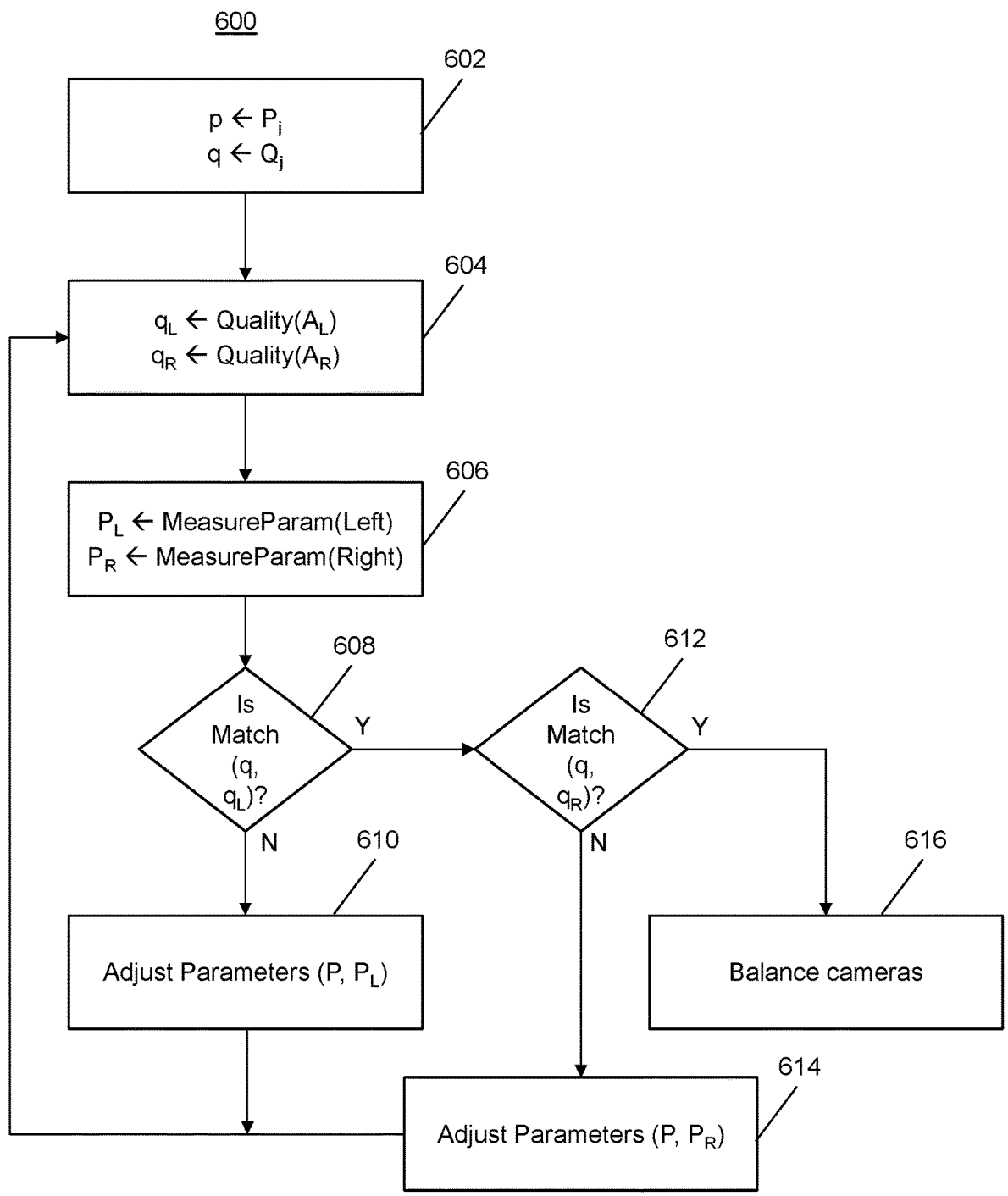
FIG. 10 is a flowchart of a process for balancing quality in images using the system and methods.

FIG. 8 is a flowchart of a process 500 for determining a subjective quality index using the systems and methods. FIG. 9 is a flowchart of a process 550 of another exemplary embodiment for determining a subjective quality index using the systems and methods. FIG. 10 is a flowchart of a process 600 for balancing quality in images using the system and methods. In FIGS. 8-10, the following conventions are used. $A_i$, $A_j$, $A_k$ represent the ith, jth, and kth images and $A_L$ and $A_R$ represent the left eye view and right eye view image, respectively. $Q_i$ is the Quality of the ith image and includes blur, brightness, specularity, contrast, etc. $P_i$ are the parameters that gave rise to the image $A_i$ of Quality $Q_i$. The parameters can include lighting, focus, zoom, glare control through polarizer, etc. For standard test images, $P_i$ and $Q_i$ are stored in the personalization system for the collection of images used for determining the subject's monocular quality index. The monocular quality index refers to the index that can give the best image and its quality and imaging parameters.

In the process 500, i is 0, j is 1, and k is 2 to start (step 502), and the corresponding images $A_i$, $A_j$, $A_j$ are displayed (step 504). If the image is the best (step 506), the process 500 includes retrieving the Quality $Q_j$ and parameters $P_j$ (step 508) and the Quality index is set at j (step 510). If the image $A_j$ is not the best (step 506), the process 500 includes determining if image $A_i$ is the best (step 512) and, if so and if i=0 (step 514), the process 500 includes setting the parameters P to j (step 516) and the process 500 goes to step 508. If i is not 0 (step 514), the process 500 includes setting q to $Q_i$, p to $Q_j$, k to j, j to i, and i is set to the match (q, p) (step 518) and the process 500 goes to step 504. If image $A_i$ is not the best (step 512), the process 500 includes checking if k=N (a number of times through the process 500) (step 520) and, if so, j is set to k (step 522) and the process 500 goes to step 508. If k does not equal N (step 518), the process 500 include setting q to $Q_k$, p to $Q_j$, i to k, j to k, and k to the match (q, p) (step 524). These steps tries to traverse the set of already captured images with known monocular quality and known imaging parameters and tries to find a match in the middle image (index j). The next image displayed depends on whether index i is chosen or index k is chosen. When index i is chosen, index k is said to be far from the subjective monocular quality and i is closer to the user's monocular quality of the image. The search finds such an image in the 'n' dimensional space of the monocular index such that the new image is closer to Ai but farther to Ak and Aj in the n dimensional space.

In the process 550, an image $A_i$ is displayed with Quality $Q_i$ (step 552). The process 550 includes determining if the image is good (step 554), and if not, the Quality $Q_i$ is adjusted (step 556) and the process 550 goes to the step 552. If the image is good (step 554), the process includes setting j to match ($Q_i$) (step 558) and the Quality index is set to j (step 560). Here the number of traversals of the standardized image collection is minimized by controlling the monocular cues in the image itself. When the quality is good enough (Step 554), a match for the image in terms of monocular quality is done with the large collection of samples images with known monocular quality and imaging parameters.

In the process 600, p is set to $P_j$ and q is set to $Q_j$ (step 602), $q_L$ is set to the Quality of image $A_L$ and $q_R$ is set to the Quality of image $A_R$ (step 604), and $P_L$ is a measure of the parameters of a left camera and $P_R$ is a measure of parameters of a right camera (step 606). The process 600 includes checking if there is a match (q, $q_L$) (step 608), and if not, the process 600 includes adjusting imaging parameters (P, $P_L$) (step 610) and the process goes back to the step 604. If there is a match (q, $q_L$) (step 608), the process 600 checks if there is a match (q, $q_R$) (step 612), and if not, the process 600 includes adjusting parameters (P, $P_R$) (step 614), If there is a match (q, $q_R$) (step 612), the cameras are balanced (step 616). Matching in the realtime is achieved by evaluating the monocular quality, comparing them with subjective quality index using match (q, qr) and match (q, qL) and adjusting the imaging parameters.

In various exemplary embodiments, the present invention discloses a synchronized stereo camera system capable of producing visual stereo differences based on the time of capture difference between the cameras capturing the eye views. These differences may normally go unnoticed in usual surgical scenarios but could get exhibited as lack of clarity while making certain surgical moves. Even though other monocular quality metrics such as blur, focus, lighting level be same, the difference in time of capture will be exhibited as lack of clarity when there is time varying elements in the view of the microscope The invention further discloses a system capable of measuring the temporal difference between the stereo pairs using an image and graphics processing system and conveying a delay signal to the leading camera through its camera control interface system; the disclosed system calibrates the differences based on the expected motion in the scene and precomputes image templates suitable for a millisecond timer; the system also has an image store where time-sensitive images may be retrieved using a time-based image index. Further, the image indices are generated based on the image frame capture and are used to retrieve the stored image pairs for a stereo view.

The present invention is an image frame synchronization system for a plurality of cameras using stereopsis to detect frame misalignment is disclosed. By stereopsis, the plurality of cameras provide the perception of depth produced by the reception in the brain of visual stimuli from both eyes in combination, so there are at least a left eye and right eye camera. The system detects and corrects the temporal misalignment in the image capture by resetting the camera starting time until the frames generated by multiple cameras are synchronized.

Figure 11:
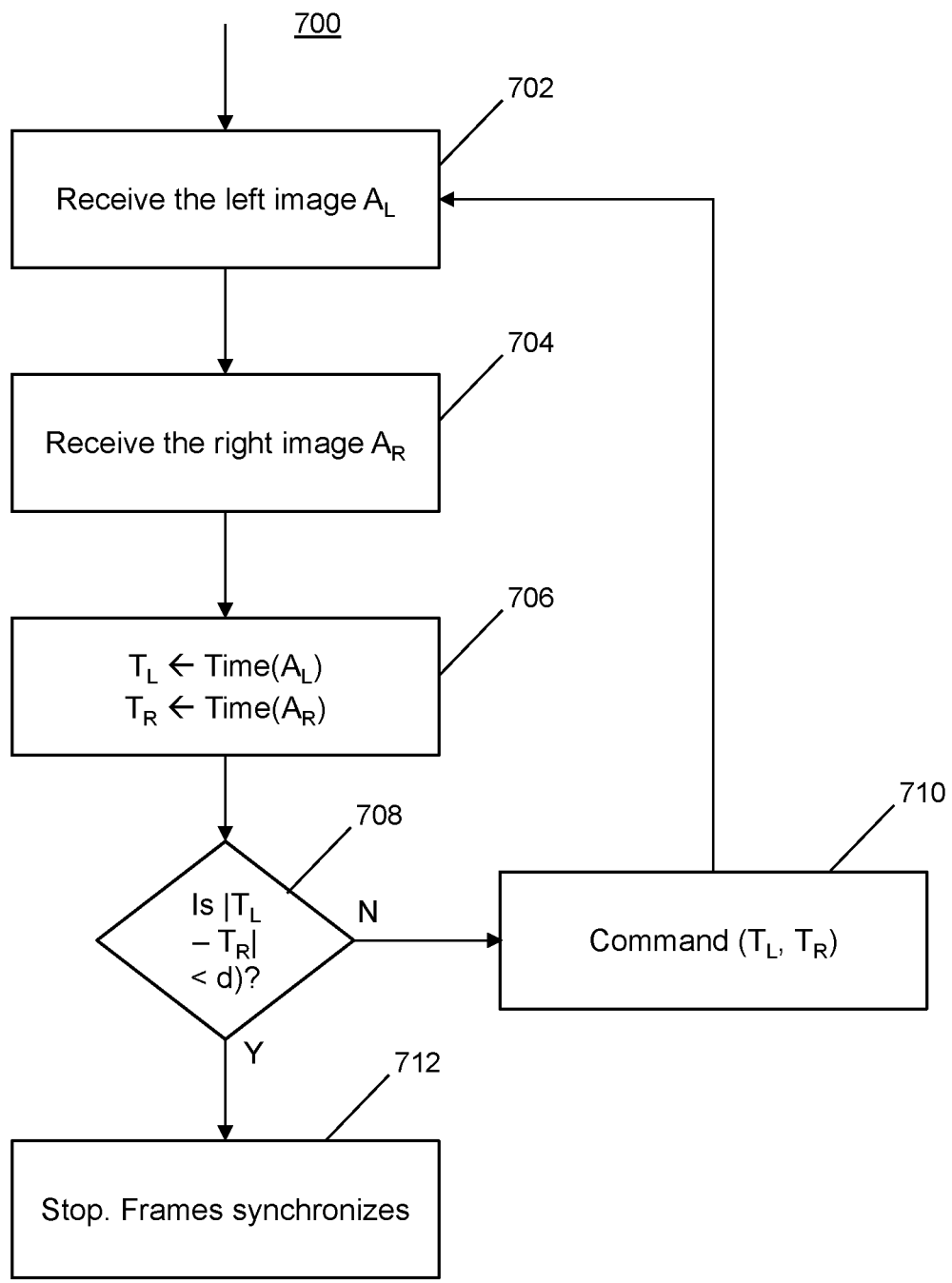
FIG. 11 is a flowchart of a frame synchronization process used to balance the right and left image frame capture time differences.

A FIG. 11 is a flowchart of a frame synchronization process 700. Here, $A_L$ and $A_R$ represent the left eye view and right eye view image, respectively, and $T_L$ and $T_R$ are their respective times. The process 700 includes receiving the left image AL (step 702), receiving the right image AR (step 704), determining the time of each (step 706), if the times are outside a threshold, d (step 708), command (TL, TR) (step 710), and if the times are not outside the threshold (step 708), stopping as the frames are synchronized (step 712).

Figure 12:
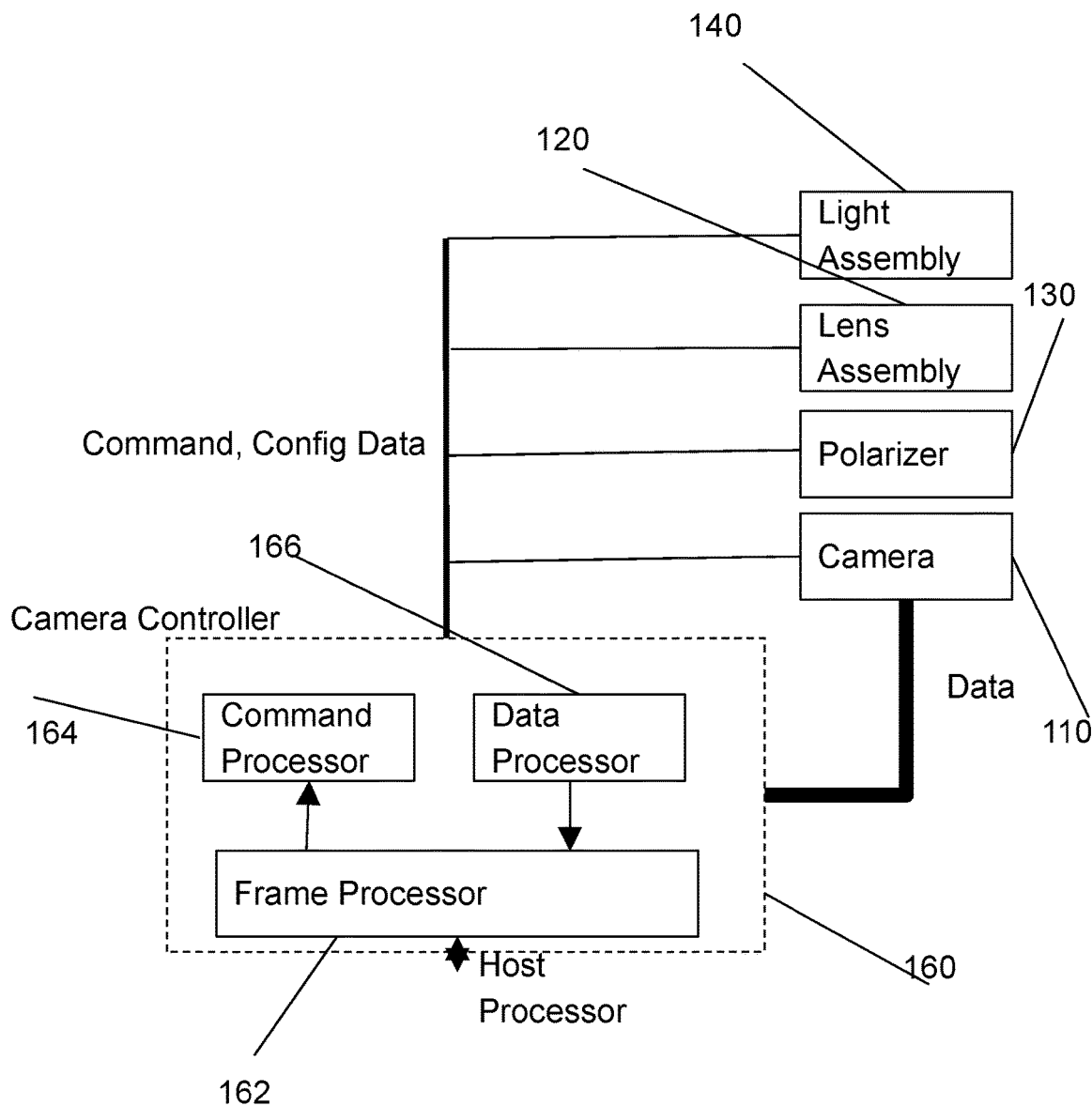
FIG. 12 is a camera system.

FIG. 12 is a camera system. When two cameras which form a stereo pair do not display the time sensitive information in perfect stereo, the camera system is sent to delay the start of capture of the field which will result in making the time sensitive information for display the same in both the cameras. The leading camera must be delayed. For detecting the leading camera, several methods may be used. In one method, the camera system is temporarily configured in mono-mode, so that the frames of one of the cameras are displayed. In another method, the index sent by the cameras are compared using modulo arithmetic and the leading camera is identified. In another method, the frames of the video are analyzed to identify the leading camera and generate the signal to delay the leading camera. The amount of delay be may be determined by different methods. In one method, the differing image indices may be difference computed to make the difference in the frames.

For example, if the camera's rate of capture is f frames per second, then 1/f is the effective camera capture time in milliseconds. If the time sensitive information is displayed in millisecond resolution, then there will be multiple milliseconds displayed in a frame capture time. Since the maximum lag between the cameras is one frame time (1/f millisecond). For example, for a 40 frames per second camera, the frame time is 25 millisecond. The number of synthetic images used in stereo pairs must be larger than the frame time so that the overlap does not occur within the expected difference.

In another method, the number of ways the difference may be produced between two millisecond timers is computed. For example, if 'm' is the maximum difference that is anticipated between the two cameras based on their frame rate, then for a range of differences (0 . . . m), the number of different ways the difference may be produced is generated. For example, to have a difference of 2, between two millisecond timers, the combinations are (0, 2) (1, 3), (2, 4), (3, 5), (4, 6), (5, 7), (6, 8), (7, 9), (8, 0) and a 1 difference in the next highest decimal place which is decimal 10's place). By knowing these different patterns, the difference between the images may be computed to yield their millisecond difference.

A new method is to synchronize each camera with its stereo pair including a newly switched on camera of a stereo pair. The method uses the display of a time dependent information such that when both cameras are synchronized, the combined image can be viewed and verified in stereo. In one method, it uses the display of a millisecond timer so that if both cameras capture the images within the same millisecond, then they both display the same image and the stereo image formed is well formed. Another method uses a time-varying display of scenes which is changed at fixed intervals of time. When the image is captured by both cameras in the same interval, the image may be viewed as a stereo pair in 3D. In another method, both cameras send an image index based on the camera's time and the rate of frame capture. The host computer generates image pairs based on the index received, and the image is visualized in stereo to generate 3D. If perfect 3D is rendered for a predefined number of images, then the cameras are considered to be in sync.

When cameras are known to be out of sync, they are brought back to sync. In one method, a camera is given an index by which it has to adjust its clock. The clock adjustment may be tested by the camera waiting for the said number of epochs and generating the image IDs. Or it may add the time for the wait and generate image IDs. If the perceived images are of good stereo quality, then the cameras are assumed to be in sync. Once the sync is achieved, it will continue to operate on the synced time.

In an exemplary embodiment, a synchronized stereo camera system is capable of producing visual stereo differences which could get unnoticed in normal surgical scenarios, but could get exhibited as lack of clarity while making certain surgical moves; the system further capable of measuring the temporal difference between the stereo pairs using an image and graphics processing system and conveying a delay signal to the leading camera through a camera control system; the system calibrates the differences based on the expected motion in the scene and precompute image templates for a millisecond timer; the system also has an optional image store where time-sensitive images may be retrieved based on an image index which is based on time.

Note, while described here with two cameras, those skilled in the art will recognize that more than two cameras are also contemplated. Also, the monocular depth cues of a particular user may be different for the user's left and right eye, requiring individual adjustment for each eye. Further, it is possible to present a differing left and right eye view in terms its various features such as CRI, focus blur, light intensity, contrast, polarization level, etc. to make the stereo view richer for the particular user. The left monocular view and the right monocular view could highlight different parameters.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:
a camera subsystem configured to be utilized by a first user, the camera subsystem including one or more right cameras configured to obtain a right image and one or more left cameras configured to obtain a left image; and
a processor subsystem configured to evaluate image quality parameters of the right image and left image and generate control commands to be provided to the camera subsystem for adjusting the one or more right cameras and one or more left cameras such that the image quality parameters of the right image and left image are more closely matched with each other;
wherein the control commands provided to the camera subsystem are further configured for adjusting the one or more right cameras and one or more left cameras to match the one or more right cameras to the one or more left cameras are based on: (1) monocular attributes of the right image and the left image and changing the image quality parameters by benchmarking against at least one of a subjective quality index and an other of the right and left images, wherein the subjective quality index being produced using a collection of sample images with a known monocular image quality and known imaging parameters, and (2) differences in image perception attributes between a left eye and a right eye stored for the first user.

2. The system of claim 1, wherein the processor subsystem evaluates a monocular image quality through monocular cues.

3. The system of claim 1, wherein the processor subsystem evaluates a monocular image quality through monocular cues which are personalized for the first user utilizing the subjective quality index, which is a subjective monocular-cue-based index.

4. The system of claim 1, wherein the control commands are configured for adjusting any one or more of focus, camera contrast function, zoom, glare levels, start of image capture, lighting levels, and light quality for the one or more right cameras and/or the one or more left cameras.

5. The system of claim 2, wherein the monocular cues comprise a plurality of focus blur, contrast, specular intensity, light intensity level, zoom level, color temperature, and R9 value in the Color Rendering Index (CRI) of the lighting.

6. The system of claim 2, wherein the monocular cues are evaluated using blur as a quality metric estimated from the right and left images and classified based on a plurality of structures in the right and left images for adjusting focus.

7. The system of claim 2, wherein the monocular cues are evaluated using intensity levels and color saturation directly assessed from the right and left images and using histogram comparisons between the right and left images.

8. The system of claim 2, further comprising a sensor subsystem configured to measure light, and to measure orientation and position of the one or more right cameras and the one or more left cameras.

9. A method comprising:
retrieving a stored subjective monocular image quality index associated with a first user;
determining image quality values from images obtained by a camera subsystem that produced the subjective monocular image quality index;

evaluating current image quality values of a right image obtained by one or more right cameras and a left image obtained by one or more left cameras in a new environment;

comparing the current image quality values with the subjective monocular image quality index; and adjusting imaging parameters of the one or more right cameras and one or more left cameras to match the one or more right cameras to the one or more left cameras are based on: (1) using monocular attributes of the right image and the left image and changing the image quality parameters by benchmarking against at least one of a subjective quality index and an other of the right and left images, wherein the subjective quality index being produced using a collection of sample images with a known monocular image quality and known imaging parameters, and (2) using differences in image perception attributes between a left eye and a right eye stored for the first user.

10. The method of claim 9, wherein evaluating the current image quality values further comprises:

balancing differences between the one or more right cameras and the one or more left cameras in terms of monocular cues.

11. The method of claim 9, wherein evaluating the current image quality values further comprises:

personalizing monocular cues for the first user utilizing the subjective monocular image quality index.

12. The method of claim 9, wherein adjusting the imaging parameters comprises adjusting any one or more of focus, camera contrast function, zoom, glare levels, start of image capture, lighting levels, and light quality for the one or more right cameras and/or the one or more left cameras.

13. The method of claim 10, wherein the monocular cues comprise a plurality of focus blur, contrast, specular intensity, light intensity level, zoom level, color temperature, and R9 value in the Color Rendering Index (CRI) of the lighting.

14. The method of claim 10, wherein evaluating the current image quality values comprises using blur as a quality metric estimated from the images and classified based on a plurality of structures in the right and left images for adjusting focus.

15. The method of claim 10, wherein evaluating the current image quality values comprises using intensity levels and color saturation directly assessed from the right and left images and using histogram comparisons between the right and left images from the one or more right cameras and the one or more left cameras.

16. The method of claim 10, further comprising a step of utilizing a sensor subsystem to measure light, and to measure orientation and position of the one or more right cameras and the one or more left cameras.

17. The system of claim 1, wherein the camera subsystem is part of a digital stereo microscope.

18. The method of claim 9, wherein the camera subsystem is part of a digital stereo microscope.

19. The system of claim 1, wherein the sample images are digital images of imaging targets acquired in a standardized manner, and wherein the sample images are separated into sets of images corresponding to different locations of where the sample images were captured.

20. The system of claim 9, wherein the sample images are digital images of imaging targets acquired in a standardized manner, and wherein the sample images are separated into sets of images corresponding to different locations of where the sample images were captured.

* * * * *